United States Patent [19]

Juncker

[11] 4,261,162
[45] Apr. 14, 1981

[54] BLADE FOR USER SUPPORTED CUTTING EQUIPMENT FOR YARD OR OTHER AGRICULTURAL PURPOSES

[76] Inventor: Kenneth J. Juncker, 233 Pearl St., Mt. Vernon, Ind. 47620

[21] Appl. No.: 19,285

[22] Filed: Mar. 12, 1979

[51] Int. Cl.³ ............................................. A01D 55/18
[52] U.S. Cl. .......................................... 56/295; 30/347
[58] Field of Search ...................... 172/13, 14, 15, 16, 172/123, 604, 555; 56/295, 255; 30/276, 347, 357

[56] References Cited
U.S. PATENT DOCUMENTS

| | | | |
|---|---|---|---|
| 1,901,778 | 3/1933 | Schlag | 172/16 X |
| 2,860,477 | 11/1958 | Chambliss | 56/295 |
| 3,176,455 | 4/1965 | Buchanan | 56/295 |
| 3,623,305 | 11/1971 | Freedlander | 56/295 |
| 3,781,991 | 1/1974 | Stretton | 56/295 |

*Primary Examiner*—Richard J. Johnson
*Attorney, Agent, or Firm*—Warren D. Flackbert

[57] ABSTRACT

A cutting blade for agricultural equipment defined by a truncated diamond configuration in plan view, where the cutting blade is made from a high strength plastic material, and where the leading or cutting edges thereof are beveled in a downward and outward direction. In an alternative embodiment, the cutting blade is in a "double diamond" shape, i.e. similar to two truncated diamond shapes at a right angle to each other. In any event, with either invention form, the cutting blade is reversible for extended use.

The invention affords particular adaptability to what is presently and commercially known as home trimming and/or edging equipment; however, more far-reaching end purposes are achieved as, for example, the effective cutting of heavy grass, brush and scrub trees because of the unique shape and the material of each cutting blade per se.

2 Claims, 8 Drawing Figures

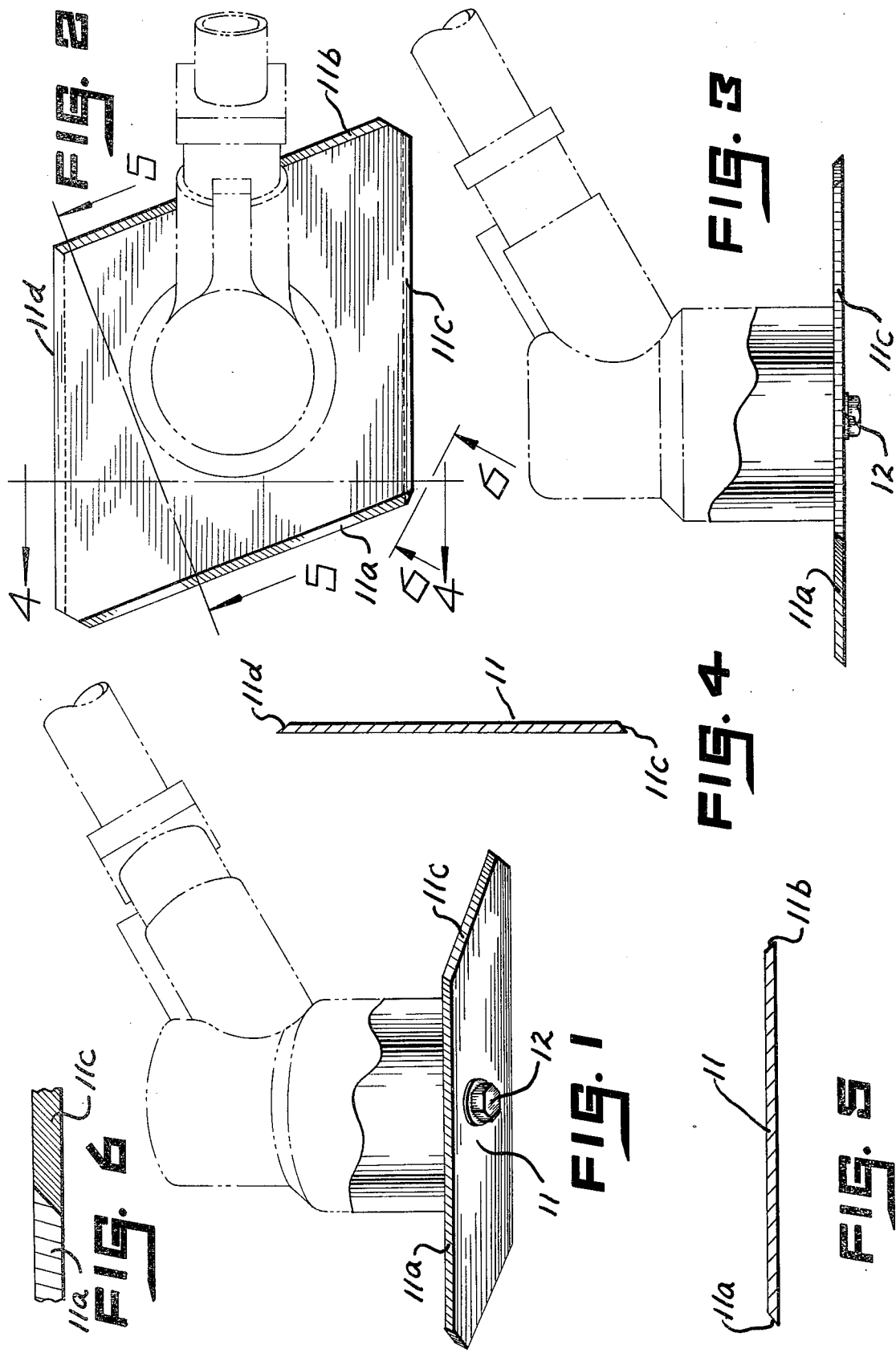

BLADE FOR USER SUPPORTED CUTTING EQUIPMENT FOR YARD OR OTHER AGRICULTURAL PURPOSES

As is known, the usage of equipment positioned on the operator's person for purposes of trimming or like cutting is quite widespread. Such equipment is either electrically or gasoline powered, and is commercially identified in the trade, by way of example, as a "Power Scythe," a "Weed & Grass Trimmer" and a "Weed Eater." In existing equipment of such type, the cutting blades in use are, typically, a monofilament or stringlike member which is selectively extended from the source thereof to provide new segments for those worn during use; and, a circular metal blade, either having saw-teeth around the periphery thereof or, perhaps, a series of spaced peripheral cut-out portions.

In any event, the usage of metal circular blades, in either of the described forms, has mostly been in connection with the gasoline powered type of equipment. As to the electrically controlled units, such have proven inadequate in the instance of encountering heavy grass, scrub trees, brush or similar growth. In other words, either the cutting itself was ineffective or continual filament replacement became a necessity. It has become apparent that the trade requires a highly improved cutting arrangement, particularly with the lighter weight electrically powered equipment, to satisfy the requirements of heavy-duty cutting, i.e. cutting beyond what might be classified as "trimming" and/or "edging."

The invention fulfills such latter need by providing a cutting blade, in one of two forms, adaptable to commercially available operator supported cutting equipment, which have a unique configuration in plan view and which, at the same time, are made from a material characterized by high impact resistant qualities. In this connection, one cutting blade of the invention assumes the shape of a truncated diamond in plan view and the other cutting blade assumes the shape of a "double diamond" in plan view, i.e. similar to two truncated diamond shaped blades at a right angle to each other.

The blades are made from plastic material, such as thermoplastic carbonate-linked polymers produced by reacting bisphenol A and phosgene, where the latter is of the type marketed by the General Electric Company under the trade name LEXAN. It might be noted that the physical characteristics of such material normally prevents the shattering of the cutting blades in the instance of striking a solid object, such as, for example, a tree, a fence post or the like.

Another feature of the instant cutting blades is that the leading or cutting edges are similarly beveled, i.e. each is beveled downwardly and outwardly. The aforesaid shapes and bevel arrangement are found to present superior results in usage, i.e. each cutting blade is reversible for extended usage; each may be readily drawn into the area being leveled; and, at the same time, each provides strength so that heavy brush, grass and the like is effectively cut by a standard powered unit, in contrast to heavier type gasoline operated units. The reversible feature is achieved by reason of each trailing edge having a bevel opposite to that of the leading or cutting edge, i.e. each is beveled downwardly and inwardly.

As stated, the cutting blades described herein are readily adaptable for mounting on existing commercially available home or like powered equipment. In any event, a better understanding of the invention will become more apparent from the following description, taken in conjunction with the accompanying drawings, wherein FIG. 1 is a perspective view showing a preferred cutting blade of the invention in combination with typical power equipment, the latter partially shown in phantom;

FIG. 2 is a top plan view of the cutting blade of FIG. 1, showing the configuration thereof in more detail;

FIG. 3 is a view in side elevation, again showing the cutting blade in combination with a fragmentary portion of the powering equipment, the latter also being presented in phantom;

FIG. 4 is a view in vertical section, taken at line 4—4 of FIG. 2 and looking in the direction of the arrows, illustrating further details of the cutting blade of FIG. 1;

FIG. 5 is another view in vertical section, taken at line 5—5 of FIG. 2 and looking in the direction of the arrows, illustrating still further details of the cutting blade of FIG. 1;

FIG. 6 is a fragmentary enlarged detailed view of a corner of the cutting blade of FIG. 1, i.e. where the oppositely beveled edges of the leading and trailing edges meet;

Figure 7:
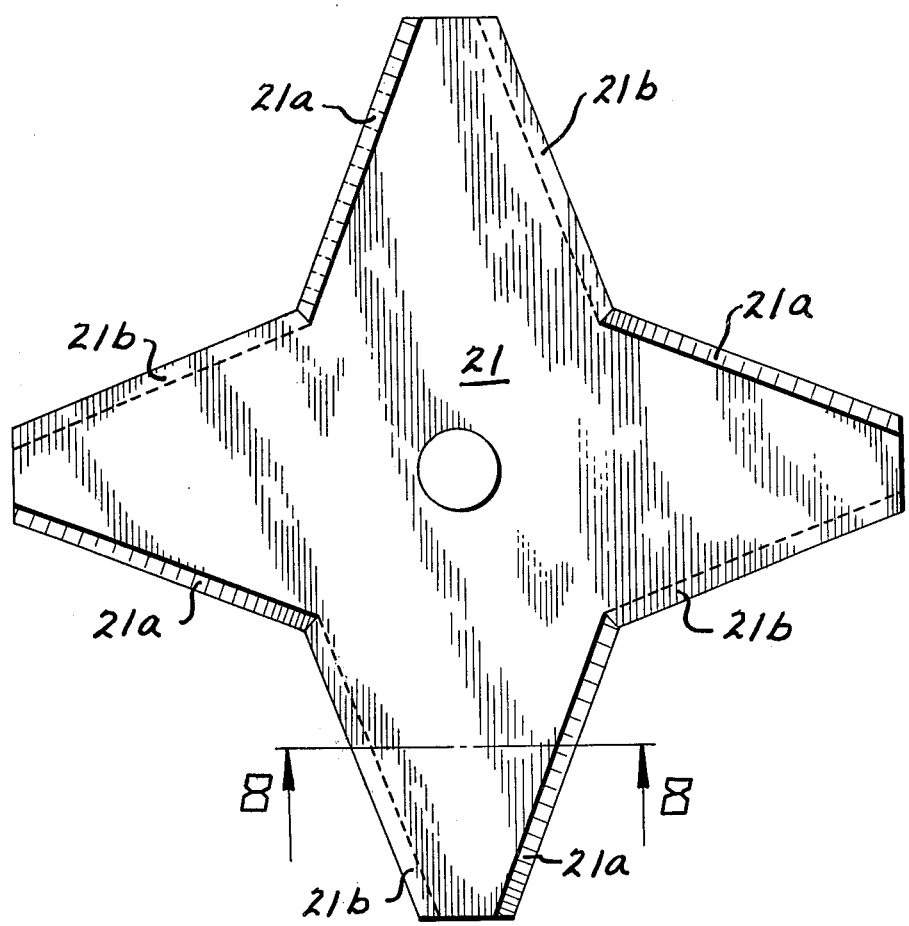
FIG. 7 is a top plan view of an alternative embodiment of the invention, such being where the cutting blade assumes a "double diamond" configuration; and, FIG. 8 is a view in vertical section, taken at line 8—8 on FIG. 7 and looking in the direction of the arrows, detailing the leading or cutting edge and the trailing edge.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 to 6, inclusive, the preferred cutting blade 11 of the invention is shown in combination with typical commercially available cutting equipment (in phantom), where the latter may be electrically or gasoline powered. Equipment of the type under discussion is generally carried on the person of the user, mostly by a sling arrangement over one of the user's shoulders, permitting freedom of the hands for directional movement during the cutting procedure. In that the aforesaid cutting equipment is, as stated, more or less standard in nature, such will not be detailed herein, except for the fact that the cutting blade 11 is readily secured thereto through, typically, a nut and washer arrangement 12.

In any event, the importance of the invention lies in two primary areas, the configuration in plan view of the cutting blade 11 and the material from which the cutting blade 11 is made. As to the former, and as evident in the figures, particularly FIG. 2, the cutting blade 11 assumes a truncated diamond configuration in plan view. In other words, a diamond is formed having edges, by way of example, approximating a length of five inches, where opposing ends of the resulting diamond shape are cut off. A hole or like opening (not readily apparent) is provided at the center of the cutting blade 11 for receiving the means 12 which secure the blade to the powering equipment.

In order to even more positively present a highly effective end usage, the edges of the cutting blade 11, i.e. edges 11a, 11b, 11c and 11d, are beveled (see particularly FIGS. 4, 5 and 6). In this connection, edges 11a and 11b, which are opposite to each other, represent the cutting or leading edges and are similarly beveled, i.e. downwardly and outwardly. Edges 11c and 11d, which are also opposite to each other, represent the trailing edges and are similarly beveled, i.e. downwardly and inwardly. In other words, the bevel of edges 11c and 11d are in an opposite direction to the bevel of edges 11a and 11b. Importantly, the combined shape and beveled edges of cutting blade 11 serve to draw such into a better cutting relationship with the material being leveled.

Figure 8:

FIGS. 7 and 8 show an alternative cutting blade 21 embodiment in the form of a "double diamond," i.e. a shape achieved by superimposing one truncated diamond form at a right angle with respect to another truncated diamond form. As in the earlier discussed preferred cutting blade 11, leading or cutting edges 21a are adjacent, in pairs, to trailing edges 21b. A truncated flat edge 21c interconnects the edges 21a and 21b.

Cutting blade 21 is also reversible for added life in view of the beveling of leading edges 21a and trailing edges 21b. In this connection, the leading edges 21a are beveled downwardly and outwardly, while the trailing edges 21b are beveled downwardly and inwardly (see FIG. 8). In any event, effective cutting results are equally achieved with the invention form of FIGS. 7 and 8.

As stated, another important feature of the invention is the usage of a high impact resistant plastic for either blade form. Typically, and as stated, a material presenting the aforesaid desired attributes is a plastic manufactured by the General Electric Company under the tradename LEXAN. While it is understood that blades for rotary power lawn mowers have, in the past, been made from plastic materials, the invention is dealing with a specialized cutting blade, i.e. one having a particular plan configuration and, as well, another type of end usage.

In other words, it should be understood that the presented combination serves to achieve the desired cutting of heavy grass, brush, scrub trees, and other growing material which has been unable to be effectively leveled by only certain of the equipment presently available. As to either blade, and as added features for strength, such may be bowed or have a slight curvature; a slightly raised rib could be provided; and, in an alternative form, a layer of aluminum could be encased within the plastic material or LEXAN defining the blade. In any event, as the cutting blade is molded, more strength is provided than if produced by shearing action or in sheet form. It might be noted that a typical cutting blade in accordance with the invention ranges in thickness from 30/1000" to ¼".

It should become evident from the preceding that the invention has provided effective cutting blades having particular adaptability for heavy cutting purposes on existing body supported and hand controlled power cutting equipment. The configuration of each cutting blade, as well as the material from which it is made, plays importance to the invention. The cutting blades provide a long life of usage, being reversible so that the trailing edges can selectively become the leading or cutting edges, and, by way of example, do not require intermittent exposure of new cutting material as in the instance of the monofilament approach.

The cutting blade embodiments described hereabove are, of course, susceptible to various changes within the spirit of the invention. In this connection, the dimensioning and proportioning may be varied, depending upon particular equipment involved; the plan configuration of the cutting blade altered; and, the like. Thus, the preceding description should be considered illustrative and not as limiting the scope of the following claims:

I claim:

1. In combination with a grass and weed trimmer, a reversible cutting blade comprising a central portion surrounded by a pair of oppositely disposed cutting edges on the bottom plane of said reversible cutting blade and an adjacent pair of oppositely disposed trailing edges on the upper plane of said reversible cutting blade presenting a generally truncated diamond shape in plan configuration, said reversible cutting blade being made from plastic material having high impact resistant physical characteristics, each of said cutting edges disposed on opposite sides defined by an outwardly and downwardly angling bevel along the entire length thereof and each of said adjacent trailing edges disposed on opposite sides defined by an inwardly and downwardly angling bevel along the entire length thereof.

2. The cutting blade of claim 1 where such has a generally double diamond shape in plan configuration.

* * * * *